May 6, 1969
J. LELIS
3,442,021
MACHINERY GAUGE
Filed Feb. 28, 1966
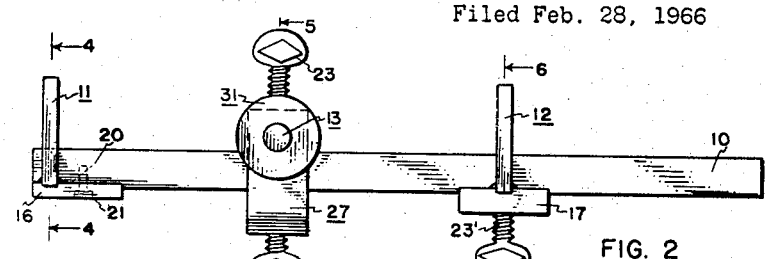
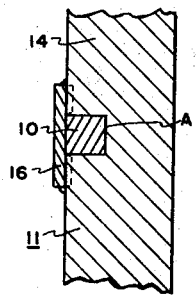
FIG. 2
FIG. 4
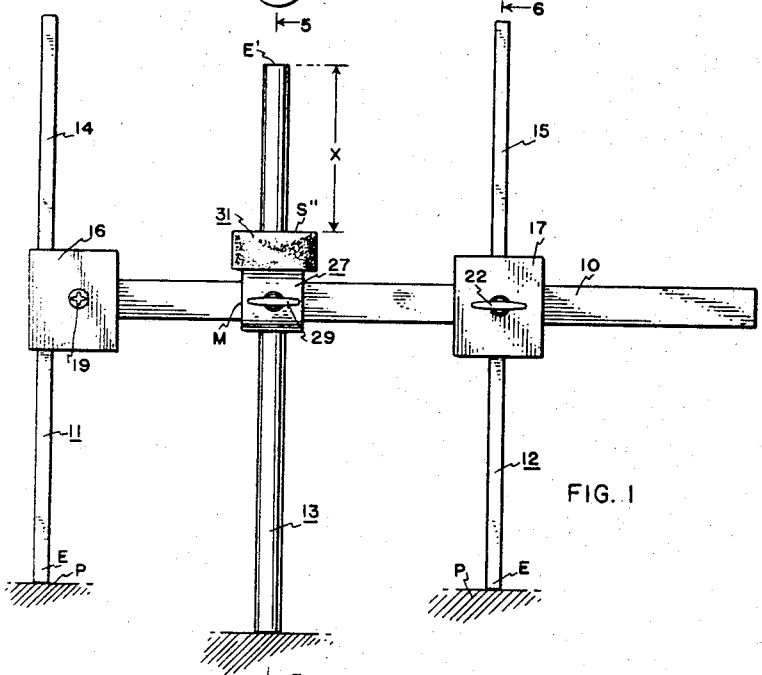
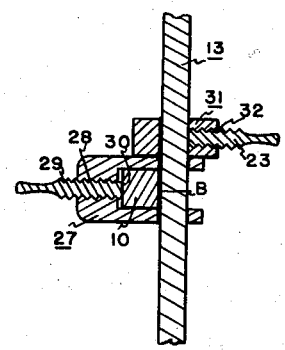
FIG. 1
FIG. 5
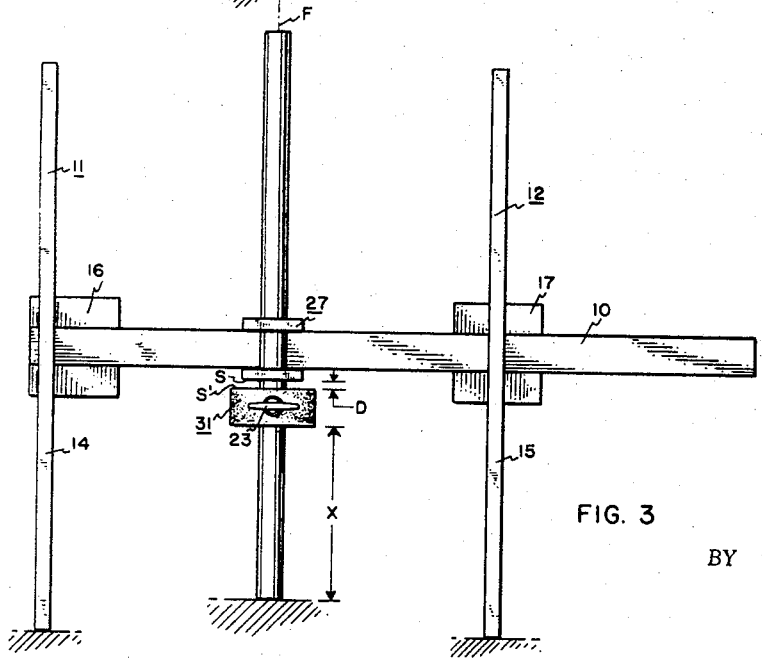
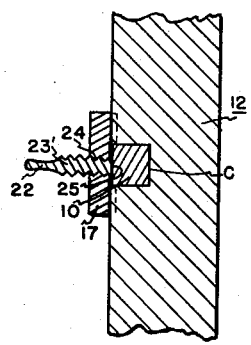
FIG. 3
FIG. 6
INVENTOR.
JOHN LELIS
BY *M. Ralph Shaffer*
HIS ATTORNEY

United States Patent Office 3,442,021
Patented May 6, 1969

---

3,442,021
MACHINERY GAUGE
John Lelis, 1833 16th Ave., Salt Lake City, Utah 84103
Filed Feb. 28, 1966, Ser. No. 530,301
Int. Cl. G01b 5/14
U.S. Cl. 33—180                                       2 Claims

ABSTRACT OF THE DISCLOSURE

The present invention presents an end-for-end reversible machinery gauge tool for measuring the internal clearance between corresponding interior parts of opposite halves of machinery to be assembled. The tool incorporates an adjustable measuring finger, and adjustable gauge means disposed thereon, for determining the proper thickness of thrust washers to be used in "making up" the machinery.

---

The present invention relates to devices such as gauges for accomplishing internal measurement in machinery and, more particularly, to a new and improved gauge useful, by way of example, for determining proper sizes of thrust washers to be used in made-up structures such as transmissions, converters, and other structures.

It will be found hereinafter that the structure under consideration serves not only in the making up of transmissions, converters, and like structures, but also as a depth-indicating means for valve guides in a cylinder head and also as an adjustment means for aiding and positioning the fingers of a clutch pressure plate.

The device of the present invention is suitable not only for measurements pertaining to small housing but also to large converter structures.

The problem solved by the present invention, in essence, is that of preliminarily taking measurement of both protrusion and recess of interior structure relative to a housing having a common flange plane. Through wear and/or large manufacturing tolerances, the distance between adjacent parts of the two halves of cooperating structures, when the housing halves are bolted together, will vary in considerable degree. Hence, there is a problem of preselecting a proper thrust washer, with desired end clearance, between the two mechanisms of the housing halves.

Accordingly, a principal object of the present invention is to provide a new and improved gauge for accomplishing exact measurements relative to selection of thrust washers, and for other uses in mechanical structures of various types.

A further object is to provide a new and improved measuring device wherein appropriate thrust washer sizes may be easily selected for a number of structures when made up, or bolted together.

A further object is to provide a new and improved gauge for transmissions, converters, and other structures having inner parts which are to be mutually spaced, when the structure is made up, in a particular manner and with a unique spacing, and this such that selection of thrust washers and other parts may be chosen with a minimum of inconvenience.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a front elevation of the device of the present invention in a preferred form thereof.

FIGURE 2 is a top plan of the structure of FIGURE 1.

FIGURE 3 is a view of the structure of FIGURE 1 wherein the same has been rotated 180° about the axis of its cross member, and wherein, additionally, the measuring finger of the structure is adjusted for contact with the inner mechanism of the mating half of the structure.

FIGURES 4, 5, and 6 are fragmentary sections taken along the lines 4—4, 5—5, and 6—6, respectively, each of these views being rotated in a clockwise direction 90° for purposes of clarity of illustration.

In the drawings, cross member 10 is shown to be preferably of square cross section, see FIGURES 4–6, and serves as a mounting means for standards 11, 12, and measuring finger 13. The standard means, though conceivably unitary, preferably comprise standards 11 and 12 which, in turn, are comprised of upstanding members 14 and 15 to which are silver-soldered respective mounting plates 16 and 17. The mounting plates 16 and 17 are, preferably, silver-soldered or otherwise affixed to their corresponding upstanding members, with the latter including corresponding apertures A, B, and C for the reception of cross member 10. A recessed configurement is desirable as shown in the left-hand portion of FIGURE 2 and in FIGURES 4 and 6, for structural rigidity and permanence.

With reference to standard 11, it will be seen that the same is preferably secured to the cross member 10 by means of a machine screw, Allen screw or the like, 19. The same is disposed in tapped aperture 20 and counterbore 21, see FIGURE 2.

A thumb screw such as a set screw 22 is provided with a shank 23' received into tapped aperture 24 of plate 17. The end 25 of thumb screw 22 is seen to abut directly against a side of cross member 10, thereby urging cross member frictionally against standard 12 relative to cross member 10 is fixed, in releasable manner.

At a medial area M of the cross member 10 there is provided a bracket 27, of general U-configuration, see FIGURE 5, and which includes a medial drilled and tapped aperture 28. The same receives the threaded shank of set screw or a thumb screw 29 the end 30 of which abuts in set screw fashion a side of cross member 10. It is seen that the thumb screw 29 serves to fix both the lateral disposition of measuring finger 13 relative to cross member 10 and also to secure the vertical disposition of measuring finger 13. See FIGURE 5 in this regard.

FIGURE 5 illustrates, in particular, that a marker 31 is provided and preferably takes the form simply of a ring, this preferably knurled on the outside. Marker 31 is provided with drilled and tapped aperture 32 which receives thumb screw or set screw 23. It is seen that the thumb screw 23 fixes the disposition of marker 31 upon the measuring finger 13.

FIGURE 3 is a view of the same structure, that is of the structure illustrated in FIGURES 1 and 2, with the exception that the structure has been reversed end-for-end. The purpose for this, in addition to illustrating further the structure under consideration, is to show the reversible-end feature of the structure to accomplish the objectives as hereinafter set forth.

The operation of the structure will now be described. It is to be seen at the outset that the structure is easily broken down for shipment through the disassociation of standard 12 from cross member 10 and also the unscrewing of screw 19 so as to release standard 11 from the cross member 10. Correspondingly, thumb screw 29 may be loosened so that the bracket 27 may be easily slid off cross member10.

When the device is assembled, see FIGURES 1–3, then it enjoys a great number of possible uses. At the outset it is to be understood that the standards 11, 12, and measuring finger 13 are all of equal length, preferably to within ½ thousandth of an inch. Of course, the allowable tolerance for deviations in length will vary upon the permissible tolerance of the work to be performed by the equipment. It will be observed that the disposition of apertures A and C in standards 11 and 12 shoud be such that the standards are mutually parallel and in mutual correspondence. This is to say, their ends E are disposed in the same plane P—P. It has been heretofore mentioned that the standards are not only equivalent in length with respect to each other, but also with respect to the measuring finger 13.

Let it be assumed that the standards 11 and 12 are appropriately mutually spaced, through the use of thumb screw 22, so that the ends E of the two standards rest upon the circular flange of the housing of the piece of equipment. Let it be assumed, further, that through the use of adjustment thumb screw 29 the measuring finger 13 has been centered over the work piece and the measuring finger 13, through the loosening of thumb screws 23 and 29, allowed to drop along its axis F to a medial region within the housing, to engage a sun gear or other structure within the housing. Thus, the extension of measuring finger 13 beyond the ends E of standards 11 and 12 protrudes into the recess into which, subsequently, the mating part or parts will protrude to make up the assembly. At this point let there be considered a tightening of thumb screws 23 and 29 so as to preserve that measurement extension of measuring finger 13 beyond the flange plane P. At this point the device is reversed end-for-end to the condition shown in FIGURE 3, to accomplish the measurement of the cooperating or mating structure. If the set screw 23 has been preserved as to its tightening, but the thumb screw 29 released, then the structure may well assume a condition as shown in FIGURE 3 wherein there will exist a space D between the marker 31 and bracket 27. This distance D will be equivalent to the distance between the cooperating structures and within which space a thrust washer is normally employed. Through the tightening of thumb screws 23 and 29, and the preservation of distance D for measuring purposes, it will be seen that there is provided a very easy way of measuring the distance into which a thrust washer must fit. Thus, a washer may be inserted into distance D and appropriately chosen so that with the use of a feeler gauge, for preserving desired end clearance, the proper washer may be selected as to desired thickness to within less than ½ thousandth of an inch. In practice, this will be to measure the distance between surfaces S and S', noting the end clearance that is desired, subtracting this end clearance from the distance D, and selecting a washer that will be in correspondence with the resultant figure. Frequently, the end clearance will have a tolerance range so that the appropriate washer may be easily selected.

In the drawings there is diagrammed a distance X. The distance X is, of course, a measurement from surface S" (when the marker at 31 is in engagement with bracket 27) to the upper end E' of measuring finger 13. It is thus seen that set screw 23 must be tightened in order to preserve this distance X, see FIGURE 3, when the tool is reversed, so as to take a measurement of the cooperating equipment. The thumb screw 29 is loosened, however, in order to allow the measuring finger 13 to drop downwardly and thus provide a space D for measurement. It is this space, less a desired clearance figure, that will comprise the washer size needed for the thrust washer to make up the equipment.

In practice the user will simply insert the desired washer and feeler gauge in space D for a plug fit, to positively determine exact end clearance (after allowing for gasket compression).

This equipment is ideally suited for making up a number of structures, such as transmissions, converters, clutch packs, measurement of valve guide structures, and other uses. Accuracy in measurement is limited only by the initial accurate determination of the ends of standards 11 and 12 and measuring finger 13, in order that these main members be equal in length.

It is thus seen that the tool is provided with means for accommodating equipment of any size flange, by the movement of standard 12 through the use of thumb screw 22, and of any type of anticipated recess and protrusion dimension, through the up-and-down adjustment of measuring finger 13 by the use of thumb screws 29 and 23. Measurement preservation is accomplished through the use of the ring or marker 31 and the use of its set screw 23.

I claim:

1. An end-for-end reversible measuring device including, in combination, a cross member; standard means affixed transversely to said cross member; a measuring finger having a longitudinal axis, said measuring finger being disposed parallel to said standard means and movably disposed along its longitudinal axis with respect to said cross member; and means for releasably fixing the longitudinal disposition of said measuring finger with respect to said cross member, said standard means and measuring finger being of equivalent length, and said standard means comprising a pair of parallel standards of equivalent length and disposed in mutual correspondence, and wherein said device also includes a marker gauge means movably disposed onto and selectively affixable to said measuring finger for determining clearance between corresponding inner parts of opposite halves of machinery to be assembled.

2. An end-for-end reversible measuring device including, in combination, a cross member; standard means affixed transversely to said cross member; a measuring finger having a longitudinal axis, said measuring finger being disposed parallel to said standard means and movably disposed along its longitudinal axis with respect to said cross member; and means for releasably fixing the longitudinal disposition of said measuring finger with respect to said cross member, said standard means and measuring finger being of equivalent length, and said standard means comprising a pair of parallel standards of equivalent length and disposed in mutual correspondence, and wherein said marker comprises a member provided with an aperture for receiving said measuring rod, and set screw means for releasably affixing said cross member to said measuring finger.

References Cited

UNITED STATES PATENTS

| 692,215 | 1/1902 | Starrett | 33—158 |
|---|---|---|---|
| 1,560,521 | 11/1925 | Andrews | 33—193 |
| 2,098,749 | 11/1937 | Johnston | 33—203.17 |
| 2,604,701 | 7/1952 | Joynes. | |
| 2,821,027 | 1/1958 | Billhimer | 33—189 |
| 3,095,651 | 7/1963 | Luedicke | 33—158 |
| 1,093,867 | 4/1914 | Legare. | |

FOREIGN PATENTS 156,281  9/1956  Sweden.

WILLIAM D. MARTIN, Jr., *Primary Examiner.*

U.S. Cl. X.R.

33—158, 175